United States Patent

Prange et al.

[15] 3,638,564
[45] Feb. 1, 1972

[54] METHOD AND APPARATUS FOR SILK SCREENING A PATTERN ON AN UNDERLYING SUBSTRATE

[72] Inventors: Bernard H. Prange; Dean W. Gintert, both of Hollidaysburg, Pa.

[73] Assignee: PPG Industries, Inc., Pittsburgh, Pa.

[22] Filed: Dec. 19, 1970

[21] Appl. No.: 3,867

[52] U.S. Cl............................101/35, 101/126, 101/129, 198/29, 271/48, 271/74, 269/119, 269/155
[51] Int. Cl.....................................B41f 17/00, B65h 29/24
[58] Field of Search..............101/35, 126, 129; 271/48, 74; 198/29; 269/118, 119, 152, 155; 118/213, 301

[56] References Cited

UNITED STATES PATENTS

| | | | |
|---|---|---|---|
| 3,527,166 | 9/1970 | Jaffa et al............................ | 101/126 X |
| 3,416,440 | 12/1968 | Miller et al. ............................ | 101/35 |
| 3,531,107 | 9/1970 | Rovin et al............................ | 271/74 X |
| 2,064,284 | 12/1936 | Wulf...................................... | 101/126 |
| 2,986,262 | 5/1961 | Powers .................................. | 198/29 |
| 3,486,441 | 12/1969 | Hillman et al. ........................ | 101/35 |

*Primary Examiner*—William B. Penn
*Assistant Examiner*—Clifford D. Crowder
*Attorney*—Chisholm and Spencer

[57] ABSTRACT

An elongated worktable has an endless foraminous conveyor belt with an upper conveying run supported on the tabletop surface. The worktable has an orienting station and a coating station. A glass sheet is conveyed by the conveyor belt to the orienting station where a pair of edge engaging members and a pair of end engaging members engage the glass sheet and orient the glass sheet longitudinally and laterally on the conveyor belt. A positive air pressure is applied upwardly through the conveyor belt to urge the glass sheet away from the upper surface of the conveyor belt while the engaging members are orienting the sheet. After the sheet is oriented, the positive upwardly flowing air pressure is stopped and a suction is applied to the conveyor belt to engage the oriented sheet to the upper conveying run of the belt. The conveyor belt, with the glass sheet engaged thereto, is moved a precise measured distance along the work table to the coating station. A silk screen with a predetermined pattern thereon is lowered onto the upper surface of the oriented glass sheet after the upper surface of the silk screen has been flooded with a coating material. A wiper is moved across the upper surface of the silk screen and coating material is forced therethrough onto the upper surface of the glass sheet. While the sheet is being coated, it remains oriented and engaged to the conveyor belt by suction. After the sheet is coated, the silk screen is raised and the coated glass sheet is conveyed along the table while the upper surface of the silk screen is again flooded with coating material.

10 Claims, 9 Drawing Figures

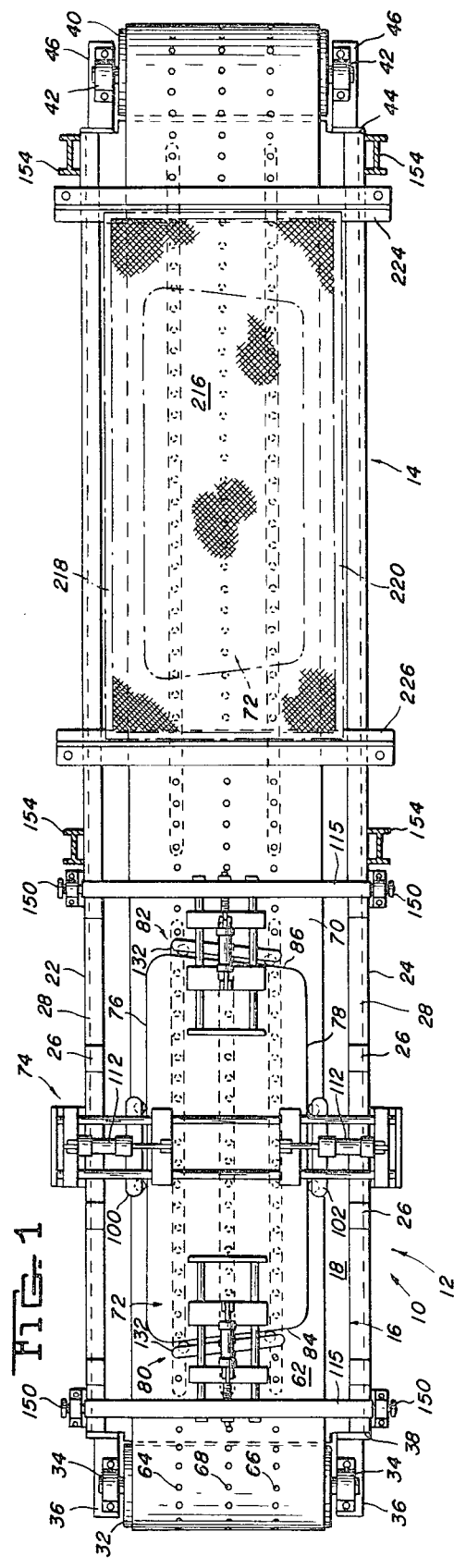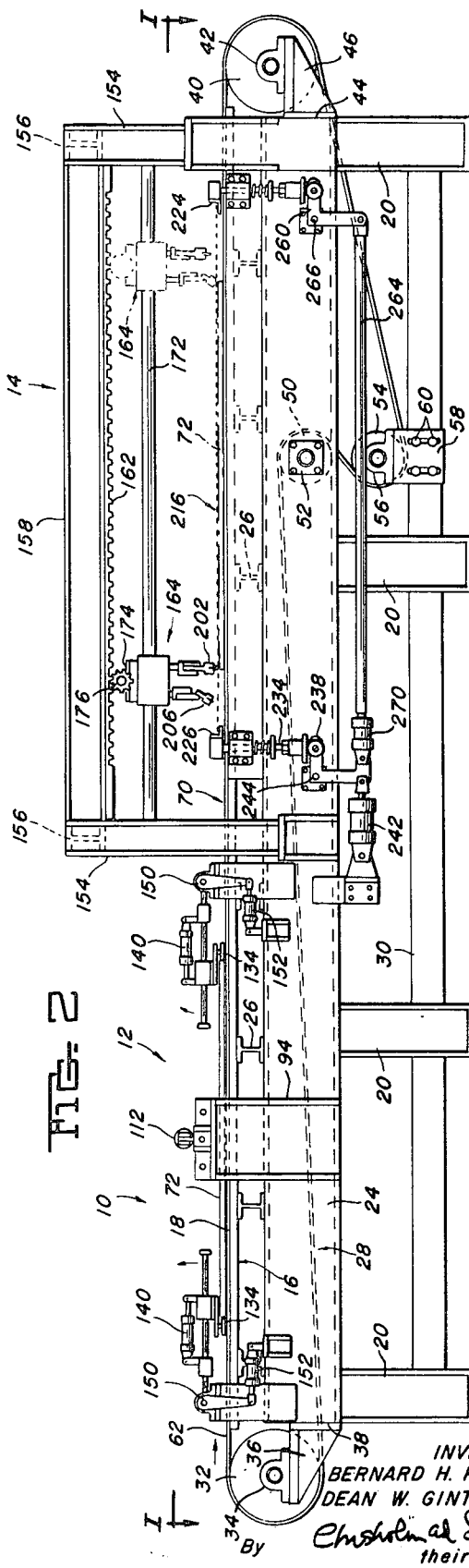

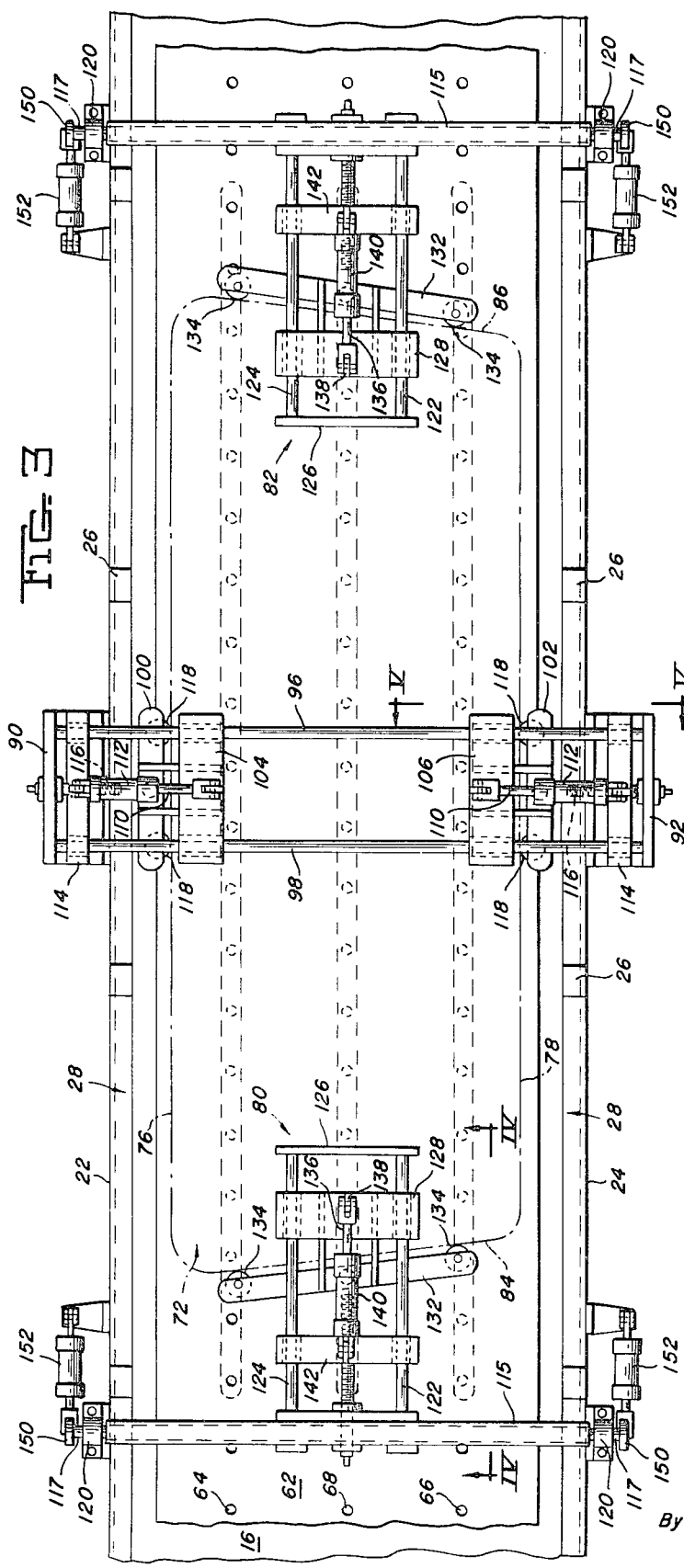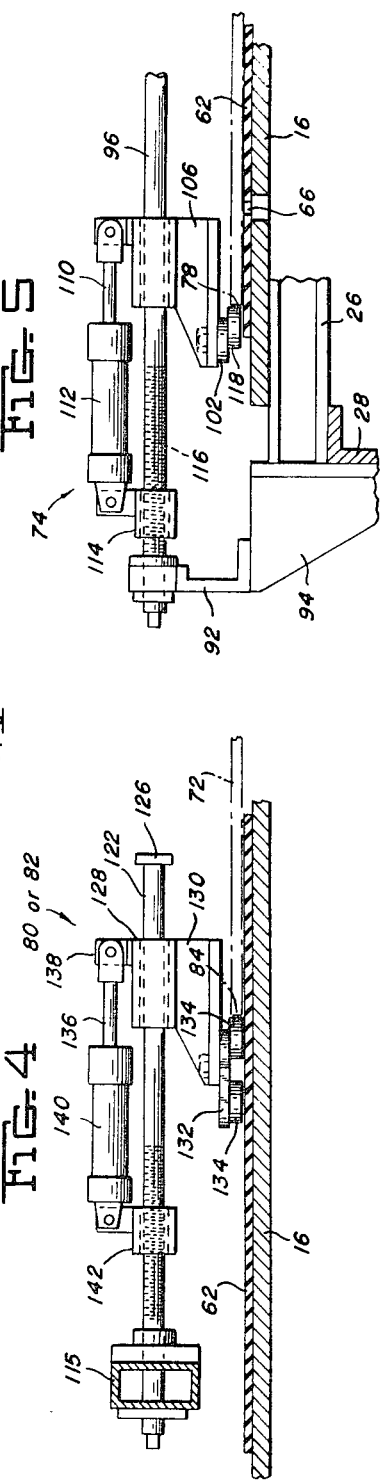

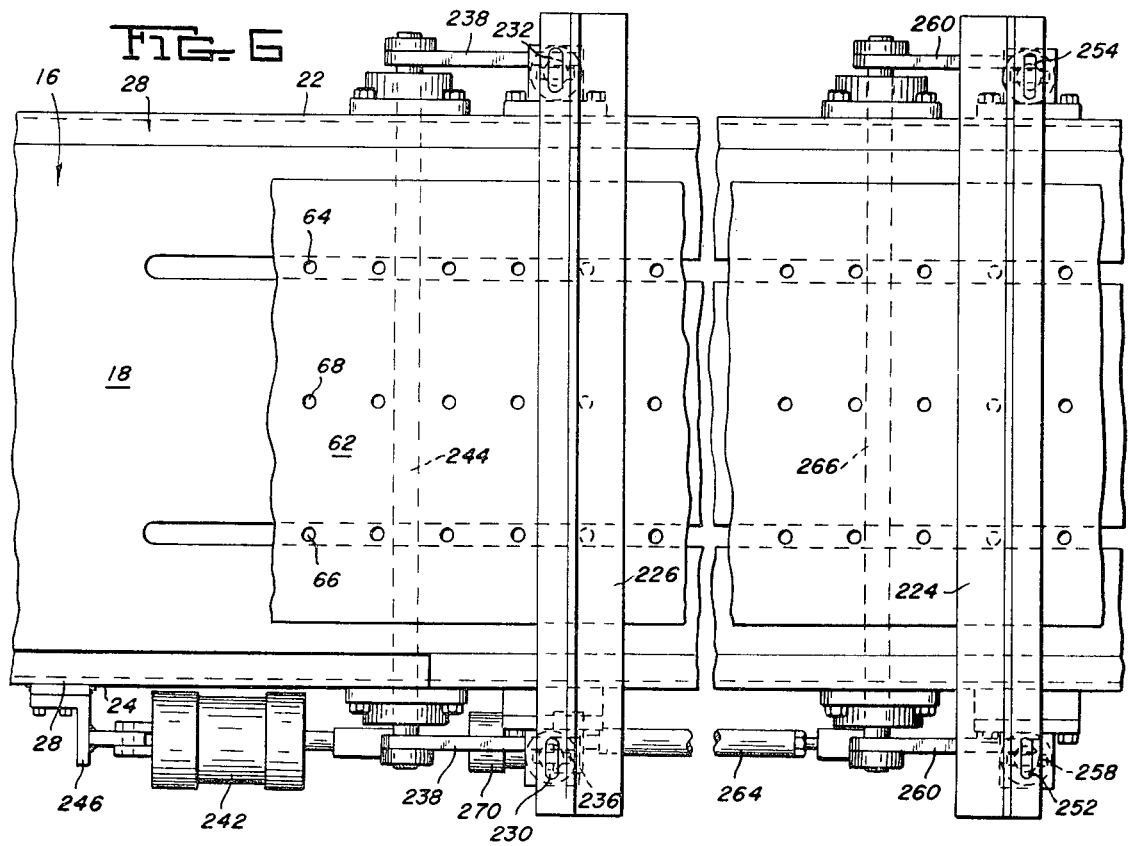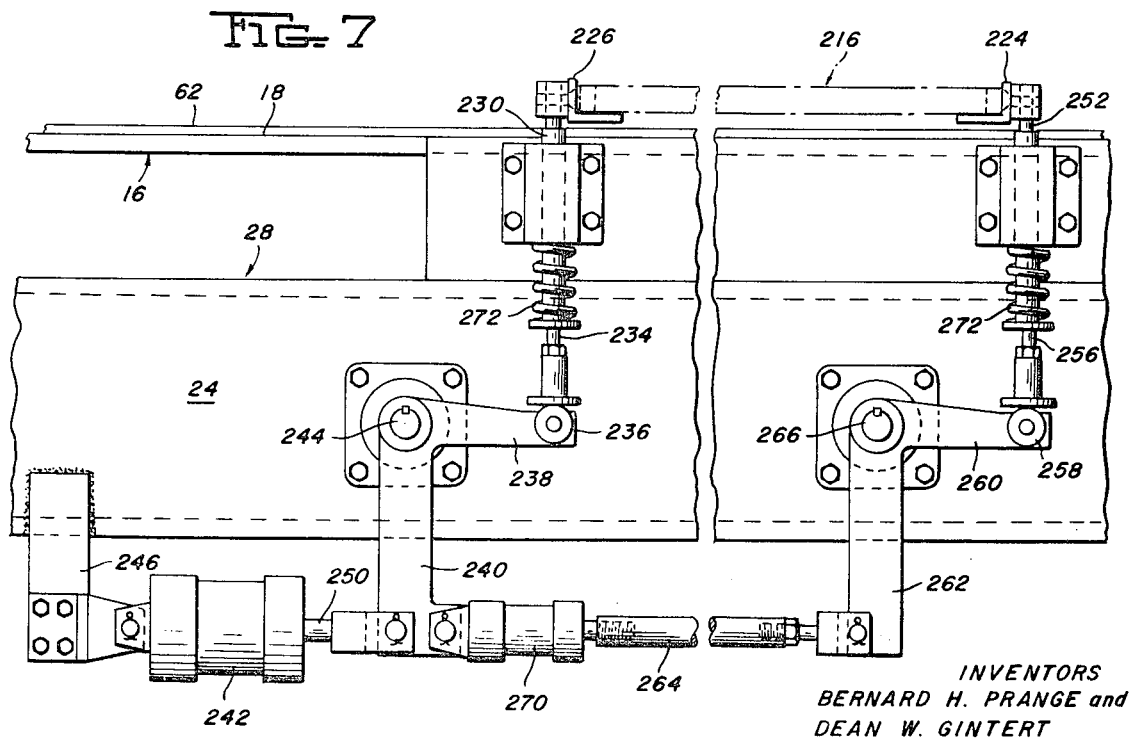

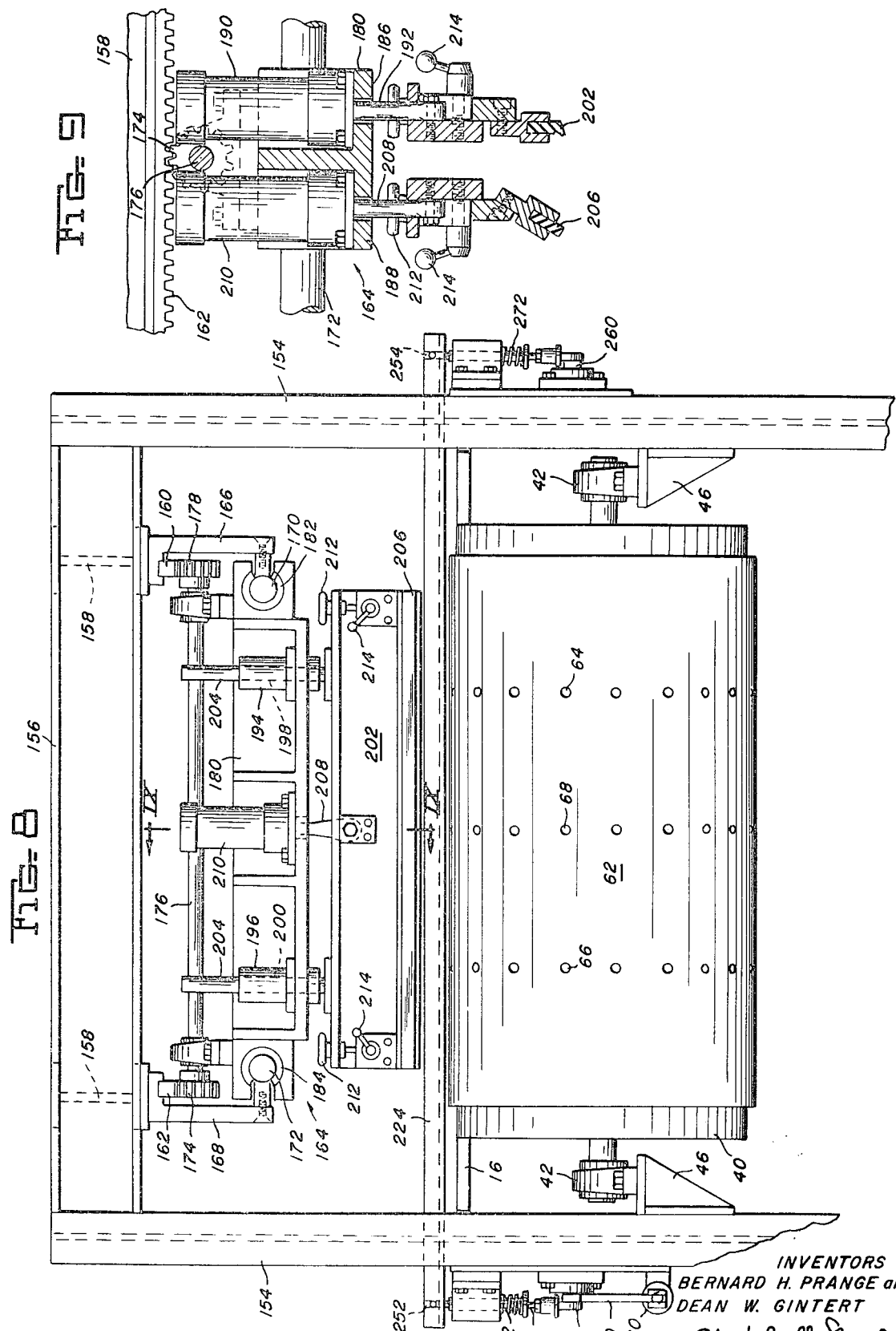

METHOD AND APPARATUS FOR SILK SCREENING A PATTERN ON AN UNDERLYING SUBSTRATE

BACKGROUND OF THE INVENTION

1. Field of the Invention

This invention relates to a method and apparatus for applying a pattern to a surface and more particularly to a method and apparatus for accurately orienting a substrate and conveying the oriented substrate to a coating station where a pattern is applied to the upper surface of the substrate.

2. Description of the Prior Art

Apparatus for applying a coating to the upper surface of a thin, fragile glass strip is disclosed in U.S. Pat. No. 3,467,004. The glass strip is conveyed from a stack by means of a vacuum bar onto a reciprocating silk screen carriage. An edge of the glass strip is aligned with an edge of the screen carriage and held in this position by suction. The silk screen carriage is then moved under a silk screen and the silk screen is lowered onto a strip and coating material is forced through the screen onto the glass strip. The screen is lifted from the glass strip and the carriage is reciprocated back to its starting position while the coated strip is scraped off the carriage. The process is then repeated with another fragile glass strip.

The apparatus disclosed in U.S. Pat. No. 3,467,004 aligns only a single edge of the glass strip with an edge of the silk screen carriage and does not orient the strip both longitudinally and laterally before it is transported to the coating station on the screen carriage. The apparatus described also limits the relative size of the strip that can be coated and the distance the strip can be conveyed on the silk screen carriage. There is a need for apparatus that remotely orients a substrate both longitudinally and laterally and thereafter conveys the oriented substrate a precise measured distance to a preselected location for coating.

SUMMARY OF THE INVENTION

Briefly, the apparatus and method of our invention includes an elongated worktable with an orienting station and a coating station. A foraminous endless conveyor belt extends longitudinally along the table and has an upper conveying run supported by the tabletop surface. At the orienting station, engaging members engage the edge and end portions of the substrate and orient the substrate relative to the conveyor belt therebeneath while air under pressure, flows upwardly through the conveyor belt to provide a cushion of air between the conveyor belt and the undersurface of the substrate. After the substrate is oriented relative to the conveyor belt therebeneath, the positive air pressure is terminated and a suction is applied through the belt to engage the substrate to the conveying run of the conveyor belt. In this oriented position, the substrate is moved with the conveyor belt a preselected distance along the worktable to thereby move the substrate into a preselected position at the coating station. A silk screen positioned above the coating station is moved into overlying position with the substrate therebelow and a coating material is applied through the substrate onto the upper surface.

With this method and apparatus, it is now possible to remotely orient a substrate, both longitudinally and laterally on an endless conveyor belt and thereafter transport or convey the substrate in this oriented position a precise predetermined distance to a coating station where a coating may be accurately applied to the upper surface of the substrate.

Accordingly, the principal object of this invention is to provide a method and apparatus for accurately orienting a substrate on a conveying device and conveying the substrate in oriented relation to a coating station.

Another object of this invention is to provide a method and apparatus for accurately orienting a substrate both longitudinally and laterally below a silk screen and applying a coating onto a surface of the substrate.

These and other objects and advantages of this invention will be more completely disclosed and described in the following specification, the accompanying drawings and the appended claims.

BRIEF DESCRIPTION OF THE DRAWINGS

In the drawings:

FIG. 1 is a top plan view of the orienting and coating apparatus, partially in section, taken along the line I—I of FIG. 2 illustrating the orienting station with the sheet engaging means and the coating station with the silk screen positioned thereabove.

FIG. 2 is a view in side elevation of the apparatus illustrated in FIG. 1.

FIG. 3 is an enlarged fragmentary top plan view of the orienting station illustrating in detail, the orienting apparatus.

FIG. 4 is a fragmentary view in side elevation taken along the line IV—IV of FIG. 3 of the sheet edge engaging members of the sheet orienting apparatus.

FIG. 5 is a fragmentary view in side elevation taken along the line V—V of FIG. 3 illustrating in detail the sheet side engaging members.

FIG. 6 is a fragmentary top plan view of the silk screen support member and the apparatus for raising and lowering the silk screen.

FIG. 7 is a fragmentary view in side elevation of the silk screen support member and the apparatus for raising and lowering the silk screen.

FIG. 8 is a view in end elevation of the worktable at the coating station illustrating in detail the bridge member reciprocally supporting the squeegee and flood bar members.

FIG. 9 is a view in side elevation taken along the line IX—IX of FIG. 8 illustrating in detail the squeegee and flood members.

DESCRIPTION OF THE PREFERRED EMBODIMENT

Referring to the drawings and particularly to FIGS. 1 and 2, there is illustrated our orienting and coating apparatus generally designated by the numeral 10 that includes both an orienting station 12 and a coating station 14. The orienting and coating apparatus 10 includes an elongated table 16 with a top plate 18 forming a planar horizontal surface and a plurality of vertical legs 20. The table 16 has side edges 22 and 24 with transverse beams 26 extending across the table 16 supporting the plate 18. Depending downwardly along the table side edges 22 and 24 are plate members 28, only one of which is clearly illustrated in side elevation in FIG. 2. Longitudinal members 30 extend between the table vertical legs 20 to provide additional rigidity thereto.

At the end portion 38 of table 16, adjacent the orienting station 12, there is an idler roller 32 rotatably supported in bearing blocks 34. The bearing blocks 34 are, in turn, connected to support members 36 extending outwardly from and secured to the vertical legs 20. Similarly, at the end portion 44 of table 16 adjacent the coating station 12, an idler roller 40 is rotatably supported adjacent the coating station 14 in bearing blocks 42. The bearing blocks 42 are similarly supported on outwardly extending support members 46 that are connected to the vertical legs 20 of table 16.

A tensioning roller 50 is rotatably supported in bearings 52 secured to the depending plate members 28 beneath the tabletop portion 18. Another tensioning roller 54 is rotatably supported in pillow blocks 56 that are secured to plate members 58. The plate members 58 are bolted to the horizontal member 30 by means of bolts 60 extending through longitudinal slots in plate 58. With this arrangement, the tensioning roller 54 is movable toward and away from roller 50. Roller 54 may also be a driven roller to propel an endless flexible conveyor belt generally designated by the numeral 62 for predetermined distances to convey glass sheets from the orienting station 12 to the coating station 14.

The endless flexible conveyor belt 62 is preferably a foraminous belt having a plurality of longitudinally aligned, spaced apertures 64 and 66 through which suction is exerted on the under surface of a substrate, as later explained, and other longitudinally aligned spaced apertures 68 through which air under pressure flows upwardly to provide a cushion between the undersurface of the substrate and the conveying run or reach 70 of the endless conveyor belt 62. The chambers and apparatus beneath the conveyor belt conveying reach 70 are not illustrated since they are of conventional construction. It should be understood, however, that any suitable means for pulling a suction through the table surface 18 and also supplying air under pressure therethrough may be employed.

With this arrangement, a substrate such as a glass sheet or backlite 72 is positioned on the conveying reach 70 of the conveyor belt 62 adjacent the table end portion 38. The glass sheet 72 may be transferred to the conveying reach 70 from another conveyor or may be manually positioned thereon. The endless conveyor belt 62 is propelled about the end idlers 32 and 40 so that the conveying reach 70 supported on the tabletop 18 is moving in a direction from the orienting station 12 to the coating station 14. The glass sheet 72 is moved by the conveyor belt 62 into the position illustrated in full lines in FIG. 1 at the orienting station 12. In this position, air under pressure flows upwardly through the apertures 68 to provide an air cushion between the undersurface of the glass sheet 72 and the upper surface of conveyor belt conveyor reach 70.

Side orienting members generally designated by the numeral 74 are arranged to engage the side edge portions 76 and 78 of the glass sheet 72 and align the sheet longitudinally on the conveyor belt conveying reach 70. Sheet end engaging members generally designated by the numerals 80 and 82 are arranged to engage the sheet end portions 84 and 86 to align or orient the sheet laterally on the conveyor belt conveying reach 70. While the engaging members 74, 80 and 82 engage the respective glass sheet side edges 76, 78 and end portions 84, 86, air under pressure is flowing upwardly through the apertures 68 to provide an air cushion between the glass sheet 72 and the conveyor belt conveying reach 70. The air cushion permits accurate alignment of the sheet 72 on the conveying reach 70 both longitudinally and laterally with little, if any, opposing friction. After the last sheet 72 is properly aligned, the airflow is stopped and suction is applied through apertures 64, 66. The engaging means 74, 80 and 82 are disengaged from the side edges and ends of the glass sheet 72 and the undersurface of sheet 72 is engaged to the upper surface of conveyor belt 62 by the suction exerted through apertures 64, 66. After the glass sheet 72 is engaged to the conveyor belt conveying reach 70 in the oriented position, the conveying reach 70 is moved a predetermined distance longitudinally to a preselected location at the coating station 14 where coating is applied to the upper surface of the glass sheet 72, as later discussed.

Referring to FIGS. 3, 4 and 5, the glass sheet engaging members 74, 80 and 82 are illustrated in detail. The sheet side edge engaging member 74 includes a pair of vertical members 90 and 92 that are secured by means of triangular brackets 94 to the vertical plates 28 of the table 16. A pair of parallel guide rods 96, 98 are secured to the vertical support members 90 and 92 and extend transversely across the table 16 above the glass sheet 72 in spaced parallel relation. Clamp members 100 and 102 are pivotally secured to bracket members 104 and 106 that are guided transversely across table 16 by the guide rods 96, 98. The bracket member 106, as illustrated in FIG. 5, is connected adjacent the upper end above the guide members 96, 98 to a piston rod 110 that extends from cylinder 112. A piston connected to the end portion of piston rod 110 within the cylinder 112 is arranged to move the piston rod 110 reciprocally in cylinder 112 a preselected distance, as for example, 3 inches when fluid under pressure is supplied to an end of the cylinder. Any conventional piston cylinder assembly that has an accurate, precise stroke is suitable. The rear portion of cylinder 112 is pivotally connected to a sleeve member 115 that is threadedly positioned on a rod 116. Rotation of threaded rod 116 moves the sleeve 114 thereon and adjusts or changes the distance of clamp 102 from a side index such as the vertical plate 28 when the piston rod 110 is in a fully extended position.

The clamp member 100 is similarly supported on the guide rods 96, 98 and actuated by means of a hydraulic cylinder and similar parts are given similar numerals. The adjustment feature of the threaded sleeves 114 and the threaded rods 116 provides a means to reorient the glass sheet 72 on the conveyor belt conveying reach 70 or to change the effective transverse dimension between the clamps 100 and 102 so that glass sheets 72 of different size may be oriented longitudinally with the same apparatus 10. With this arrangement, the transverse orienting member 74 will orient the glass sheet 72 longitudinally on the conveyor belt conveying reach 70. It is preferred that both hydraulic cylinders 112 be actuated at the same time to extend the piston rods 110 so that the clamps 100 and 102 move the abutment discs 118 secured thereon into engagement with the respective side edges 76, 78 of glass sheet 72.

The glass sheet end portions 84 and 86 are oriented on the conveyor belt conveying reach 70 by the engaging devices 80 and 82. Since the engaging devices 80 and 82 are of similar construction, the engaging device 80, illustrated in FIG. 4, will be described in detail and similar numerals are provided for similar parts of the engaging device 82. A transverse support member 115 of generally rectangular configuration has cylindrical end portions 117 suitably supported in bearing blocks 120. A pair of guide rods 122 and 124 extend forwardly from the transverse support member 115 above the table 16 and terminate in a transverse bar 126. A slidable bracket member 128 has a pair of longitudinal passageways through which the guide rods 122 and 124 extend. With this arrangement, the bracket member 128 is free to reciprocate on the guide rods 122 and 124. The bracket member 128 has a depending flange 130 to which the clamp member 132 is pivotally secured and has discs 134 rotatably secured thereon. A piston rod 136 is pivotally secured to an upstanding lug 138 on the bracket member 128 and a hydraulic cylinder 140 is pivotally secured to a threaded sleeve 142. With this arrangement, movement of the piston rod 136 reciprocally in cylinder 140 moves the clamp mechanism 132 toward and away from the end portion 84 of glass sheet 72. The other end engaging member 82 is of similar construction and has a similar adjusting means for the clamp member 132.

With this arrangement, it is possible to adjust the relative position of clamp members 132 to accurately orient the sheet transversely on the conveyor belt conveying reach 70. Also with this arrangement, it is possible to adjust within limits, the dimension between the clamp members 132 when the piston rods 136 are in an extended position. It is also preferred to simultaneously supply hydraulic fluid to the cylinders 140 and the cylinders 112 to simultaneously clamp or engage the side edges 76, 78 and end portions 84, 86 of the glass sheet 72.

Referring to FIG. 2, the transverse members 115 have a depending level 150 connected to a piston cylinder assembly 152. The piston cylinder assembly 152 is arranged to pivot the levers 150 toward each other and thus lift the clamp mechanisms 132 above the conveyor belt conveying reach 70 and above the upper surface of the glass sheet 72. With the previously described arrangement, the glass sheet 72 can be rapidly and accurately oriented on the upper surface of a conveyor belt conveying reach.

The glass sheet 72 is preselected longitudinal and transverse alignment on the conveyor belt 70 is conveyed a measured distance along the worktable 16 while the sheet 72 remains engaged to the conveying reach 70 by means of suction through the apertures 64, 66 in a foraminous belt 62. The conveyor belt, after the alignment of the glass sheet 72, is moved a measured distance in response to a conventional distance measuring device, such as a high-speed—low-speed program to move the sheet into a preselected oriented position in the coating section 14. The distance travelled by the conveyor belt 62 is preferably held precisely by a pulse generator or the like. The conveyor belt 62 is driven by a DC motor and is preferably controlled by an SCR through an automatic two-speed transmission which may have a top speed of 1,000 inches per minute and a slow speed of 1 inch per minute. At the slow speed, inertia of the conveyor belt 62 and the glass sheet 72 thereon is minimized.

Referring to FIGS. 1, 2 and 6–9, the coating section 14 includes pairs of spaced vertical support members 154 on opposite sides of the table 16. Horizontal transverse members 156 (FIG. 8) extend across the table 16 between the pairs of vertical members 154. Longitudinal members 158, one of which is illustrated in FIG. 2, and horizontal members 156 provide a rigid frame above the coating section 14. A pair of spaced gear-type rack members 160 and 162 are suitably secured to the transverse members 156 in spaced parallel relation to each other and extend longitudinally above the coating station 14 to form a support member for the squeegee and flood bar mechanism generally indicated by the numeral 164 and illustrated in detail in FIGS. 8 and 9. The rack members 160, 162 have depending portions 166 and 168 that are connected to horizontal guide rods 170 and 172. The ends of guide rods 170 and 172 are secured to vertical members 154 to provide a rigid bridge for the flood and squeegee bar assembly 164. As illustrated in FIG. 2, the flood and squeegee bar assembly 164 is arranged to move longitu;inally above the tabletop surface 18 and is propelled longitudinally by the pinions in meshing relation with the racks 160 and 162. As illustrated in FIG. 9, the rack 162 has a pinion gear 174 meshing therewith and connected to a rotatable shaft 176 that is suitably driven. A similar pinion gear 178 meshes with the rack 160 and is nonrotatably connected to the transverse shaft 176.

The squeegee and flood bar assembly has a transverse member 180 with cylindrical end portions 182 and 184. The guide rods 170 and 172 extend through guide passageways in the end portions 182 and 184 to permit the squeegee and flood bar mechanism 164 to reciprocate longitudinally above the table 16 at the coating station 14. As illustrated in FIG. 9, the transverse bar 180 has laterally extending flange portions 186 and 188. A piston cylinder assembly 190 is secured on the laterally extending flange 186 with the piston rod 192 extending downwardly therefrom. Guide members 194 and 196 have vertical passageways 198 and 200 therein. A squeegee bar 202 is secured to the depending piston rod 192 and has vertically extending guide rods 204 extending upwardly through the passageways 198 and 200 in guide members 194 and 196. With this arrangement, introducing hydraulic fluid into the cylinder of assembly 190 moves the squeegee bar 202 downwardly onto a silk screen, as later explained.

A flood bar 206, illustrated in FIG. 9, is connected to a piston rod 208 of a piston cylinder assembly 210 that is arranged to move the flood bar 206 vertically into and out of contact with the upper surface of a silk screen. Similar guide members and guides (not shown) are provided for the flood bar 206 as for the squeegee bar 202. Other adjustment devices for both bars 202 and 206 may be provided such as end adjusters 212 and 214. With this arrangement, the squeegee and flood bar assembly 164 is arranged to move reciprocally along the longitudinal axis of the table 16 and either the flood bar 206 or squeegee bar 202 may be lowered into contact with a silk screen 216 positioned therebelow. The silk screen 216 is illustrated in detail in FIGS. 1, 6, 7 and 8 and is of conventional construction. The silk screen 216 is positioned between the tabletop 18 and the squeegee flood bar assembly 164 and has a frame member with longitudinal side portions 218 and 220 and transverse portions 224 and 226. The transverse portions 224 and 226 extend outwardly beyond the table side edges 22 and 24.

As illustrated in detail in FIGS. 6 and 7, apparatus to raise and lower the screen 216 relative to the upper surface of the glass sheet 72 is illustrated. The screen frame transverse member 226 is connected adjacent its end portions to vertical rods 230 and 232. The vertical rods 230 and 232 are each, in turn, connected through a spring member to another coaxial lower rod 234 illustrated in FIG. 7. The lower rod 234 is, in turn, pivotally connected to an end portion 236 of a bellcrank lever 238. The other end 240 of bellcrank lever 238 is connected to a piston cylinder assembly 242. The intermediate portion of bellcrank lever 238 is keyed to a shaft 244. The shaft 244 is rotatably supported in table side members 28 and extends transversely beneath the tabletop 18. The shaft 244 is connected to a similar bellcrank lever 238 on the opposite side of the table 16. The piston cylinder assembly 242 is pivotally connected to a bracket 246 depending from the table side portion 28 so that piston rod 250 reciprocates while the cylinder portion remains stationary. With this arrangement, the piston rod 250, upon extension of cylinder 242, rotates the bellcrank levers 238 that in turn raises one end of the screen member 216 adjacent the transverse frame member 226.

The other transverse frame member 224 is connected adjacent its end portions to downwardly extending vertical rods 252 and 254 in the same manner as frame member 226 is connected to rods 230 and 232. The rods 252 and 254 are each connected through a resilient spring to a second depending rod member 256. As illustrated in FIG. 7, the end of rod 256 is connected to an end portion 258 of a bellcrank lever 260. The other end 262 of bellcrank lever 260 is connected to a horizontally extending rod 264. The intermediate portion of bellcrank lever 260 is keyed to a shaft 266 that extends beneath the upper surface of table 16 and is connected to a similar bellcrank lever 260 on the opposite side of the table 16. The shaft 266 is rotatably supported in the table side portion 28. With this arrangement, rotation of lever 260 by means of rod 264 will raise and lower the silk screen frame end portion 224.

A piston cylinder assembly 270 is provided between the end of horizontal rod 264 and the depending arm 240 of lever 238. The piston cylinder assembly 270 is arranged to extend or elongate the rod 264 to thus first raise the silk screen frame end portion 224 to strip the silk screen from the upper surface of the glass sheet 72 and thereafter, outward movement of piston 250 will lift the silk screen from the glass sheet 72. The coil springs 272 are arranged to urge the silk screen 216 downwardly onto the upper surface of the glass sheet 72 with a preselected force so that when the squeegee 202 is lowered onto the upper surface of the screen and moved reciprocally thereon, it will force a coating material through a preselected pattern on the screen. For example, to apply a pattern of lines of silver paste to a surface of a backlite so that the continuous lines of silver paste may be used for heating purposes and as a conductor of electrical power, the silk screen would be provided with a pattern of a series of spaced parallel lines extending longitudinally thereon.

With the above described apparatus, after the glass sheet 72 is precisely positioned at the coating station 14, the silk screen 216 is lowered by means of the bellcrank levers 238 and 260 and the piston cylinder assembly 242. The flood bar squeegee bridge assembly 164 illustrated in FIGS. 8 and 9, lowers the squeegee bar 202 onto the upper surface of the silk screen 216. The silk screen having been previously flooded with a coating material such as silver paste. The squeegee bar is then reciprocated longitudinally along the silk screen 216 to force the coating of silver paste through the lined pattern in the silk screen to thus apply a plurality of lines of silver paste onto the upper surface of the glass sheet 72. After the squeegee work is performed, the squeegee bar 202 is raised and the strip cylinder 270 is actuated to lift the silk screen frame end 224 and strip the screen from the upper surface of the glass sheet 72 without smudging or marring the lines coated thereon. The remainder of the screen is then raised by actuation of the piston cylinder assembly 242 through the bellcrank levers 238 and 260. The flood bar 206 is then lowered onto the raised screen and is reciprocated thereon to apply an even coating of the silver paste to the upper surface of the silk screen 216. While the flood stroke is being performed, the coated glass sheet 72 is conveyed toward the table end portion 44 and a new glass sheet 72 is delivered to the coating station 14 after being precisely oriented at the orientation station 12 of worktable 16.

It will be apparent from the above that it is now possible with the apparatus described, to accurately and precisely orient a substrate and thereafter, convey the substrate to a second location where it is precisely positioned for coating in a preselected manner. For instance, by positioning all four cylinders 140 and 112 symmetrically with respect to the geographical center of the desired position for the glass sheet at the orienting station 12 and having all four cylinders move inward simultaneously at identical velocities to engage the glass sheet 72, it is possible to orient and align each individual glass sheet 72 in sequence relative to its geographical center, regardless of its size and outline configuration. Therefore, each sheet in turn is properly aligned at the orienting station 12 and, by moving the conveyor belt conveying reach 70 a predetermined distance, each sheet is brought into exactly the position of alignment desired relative to the coating station 14.

The use of the term "silk screen" is not intended to describe the material of which the screen 216 is made. It is obvious that the screen may be made of many other materials, for example, stainless steel, nylon and any other material having suitable characteristics such as long life, resistance to chemical or mechanical attack by the printing material used and the like. It is also noted that the screen lifting mechanism described above represents an improved structure over known prior art devices that lift associated structures in addition to the screen and its frame, thereby resulting in a less efficient operation than that developed by the apparatus described herein.

According to the provisions of the patent statutes, the principle, preferred construction and mode of operation of our invention have been explained and what is now considered to represent its best embodiment has been illustrated and described. However, we desire to have it understood that, within the scope of the appended claims, the invention may be practiced otherwise than as specifically illustrated and described.

We claim:

1. Apparatus for applying a pattern onto a flat, fragile substrate comprising,
   an elongated worktable having a work orienting station and a coating station disposed in longitudinally spaced relation along said worktable,
   an endless, foraminous conveyor belt having an upper conveying run positioned on the upper surface of said worktable and extending longitudinally through said work orienting station and said coating station,
   orienting means positioned adjacent to said orienting station, said orienting means arranged to engage said substrate and position said substrate at a preselected location on the upper surface of said endless conveyor belt upper conveying run,
   said orienting means comprising a first pair of engaging members reciprocally movable relative to said worktable toward and away from each other, said first pair of engaging members operable to engage the side edge portions of said substrate and orient said substrate relative to the longitudinal axis of said worktable, a second pair of engaging members movable reciprocally relative to said worktable toward and away from each other, said second pair of engaging members operable to engage the end portions of said substrate and orient said substrate relative to a transverse axis of said worktable, positive air pressure means positioned below said table and operable to blast air through said upper run of said foraminous conveyor belt to provide a cushion of air between said substrate and said conveyor belt at said orienting station when said engaging members engage said edge and end portions of said substrate,
   engaging means to engage said substrate to a portion of said conveyor belt upper conveying run so that said substrate moves with said endless conveyor belt conveying run on said worktable,
   said engaging means including suction means positioned below said worktable and operable to apply suction through said upper run to engage said substrate to said conveyor belt after said substrate is oriented relative to said conveyor belt at said preselected location on said upper surface,
   means to move said endless conveyor belt a preselected distance along said worktable while said suction means is operating so that said substrate engaged to a portion of said endless conveyor belt is moved to a preselected location at said coating station, and
   means to apply a pattern of coating material onto the upper surface of said oriented substrate at said coating station.

2. Apparatus for applying a pattern onto a substrate as set forth in claim 1 in which said means to apply a pattern of coating material to said substrate includes,
   a silk screen positioned above said worktable at said coating station,
   positioning means to move said silk screen into overlying oriented position with said substrate therebelow, and
   reciprocating means to apply a quantity of coating material through said silk screen in a preselected pattern onto the upper surface of said substrate.

3. Apparatus for applying a pattern onto a substrate as set forth in claim 2 in which said positioning means to move said silk screen into overlying relation with a substrate positioned therebelow includes,
   means to first lift one end of said silk screen from said substrate to strip said silk screen from said substrate and prevent damage to the applied coating on said substrate.

4. Apparatus as in claim 1, for applying a pattern on a nonrectangular substrate wherein at least one of said pairs of engaging members comprises means to move said latter engaging members in synchronism and means to pivotally adjust the orientation of said engaging members relative to said means for moving said members in synchronism to orient said engaging members parallel to the orientation desired for said engaged portions.

5. Apparatus for applying a pattern onto a substrate which includes,
   an elongated worktable having a work orienting station and a coating station,
   an endless conveyor belt having an upper conveying run positioned on the upper surface of said worktable,
   orienting means positioned adjacent to said orienting station, said orienting means arranged to engage said substrate and position said substrate at a preselected location on the upper surface of said endless conveyor belt upper conveying run,
   engaging means to engage said substrate to a portion of said conveyor belt upper conveying run so that said substrate moves with said endless conveyor belt conveying run on said worktable,
   means to move said endless conveyor belt a preselected distance along said worktable so that said substrate engaged to a portion of said endless conveyor belt is moved to a preselected location at said coating station, and
   means to apply a pattern of coating material onto the upper surface of said oriented substrate at said coating station,
   a pair of vertical support members on opposite sides of said table at said orienting station, said vertical support members extending upwardly above said conveyor belt conveying run,
   a horizontal guide member secured to said vertical support members and extending across said elongated worktable above said conveyor belt conveying run,
   a pair of side edge engaging members each secured to one of said vertical support members and supported on said horizontal guide member for reciprocal movement toward and away from each other, and
   means associated with both of said side edge engaging members arranged to limit movement of said side edge engaging members toward each other to thereby orient a substrate longitudinally on said conveyor belt by engaging the side edges of said substrate with said pair of side edge engaging members.

6. Apparatus for applying a pattern onto a substrate as set forth in claim 5 which includes,
a pair of spaced transverse support members extending transversely across said worktable at a location above said conveyor belt conveying run,
a pair of end engaging members each supported on one of said support members and facing toward each other,
said end engaging members including means to reciprocate portions thereof toward and away from each other, and
means to limit movement of said end engaging members toward each other to thereby orient a substrate transversely on said conveyor belt by engaging the end portions of said substrate with said pair of end engaging members.

7. Apparatus for applying a pattern onto a substrate as set forth in claim 6 which includes,
means to rotate said transverse support members and move said end engaging members upwardly above said conveyor belt and said substrate positioned thereon to provide clearance for said substrate while being conveyed on said conveyor belt from said orienting station to said coating station.

8. A method of silk screening a pattern onto a flat, fragile substrate comprising,
transporting a substrate on a surface of an endless, foraminous, conveyor belt to an orienting station on a worktable,
orienting said substrate on said conveyor belt at said orienting station by directly engaging opposite edge portions of said substrate with pairs of alignment members movable toward one another,
applying a positive air pressure upwardly through said conveyor belt at said orienting station and urging said substrate away from the surface of said conveyor belt while orienting said substrate in a desired oriented position relative to said conveyor belt,
applying a suction through said conveyor belt at said orienting station after said substrate has been oriented on said conveyor belt to thereby engage said substrate to said conveyor belt,
removing said alignment members,
conveying said substrate in an oriented position on said conveyor belt a preselected distance on the worktable to a coating station,
maintaining said suction through said conveyor belt between said orienting station and said coating station to thereby maintain said substrate in said desired oriented position on said conveyor belt while said substrate is conveyed from said orienting station to said coating station with said alignment members out of engagement with said edge portions,
applying a pattern onto the upper surface of said substrate while maintaining said substrate in said oriented position on said conveyor belt at said coating station, and
conveying said substrate away from said coating station on said endless conveyor belt.

9. A method of silk screening a pattern onto a substrate as in claim 8 wherein said substrate is oriented and aligned with respect to its geographical center at said orienting station.

10. A method of silk screening a pattern onto a substrate of nonrectangular outline as in claim 8, further including the step of orienting said alignment members to be parallel to the desired orientation of the respective edge and end portions of the substrate they engage during said orienting before engaging said substrate edge and end portions.

* * * * *